(12) United States Patent
Skrmetta

(10) Patent No.: US 6,435,959 B1
(45) Date of Patent: Aug. 20, 2002

(54) ASSEMBLY FOR A SEAFOOD CLEANING MACHINE

(76) Inventor: Raphael Q. Skrmetta, 3536 Lowerline, New Orleans, LA (US) 70125

(*) Notice: Subject to any disclaimer, the term of this patent is extended or adjusted under 35 U.S.C. 154(b) by 0 days.

(21) Appl. No.: 09/790,962

(22) Filed: Feb. 22, 2001

(51) Int. Cl.$^7$ .............................................. A22C 29/00
(52) U.S. Cl. ............................................ 452/5; 452/9
(58) Field of Search ............................... 452/5, 9, 1, 2

(56) References Cited

U.S. PATENT DOCUMENTS

| | | | |
|---|---|---|---|
| 2,781,544 A | | 2/1957 | Skrmetta |
| 2,818,598 A | | 1/1958 | Skrmetta |
| 3,031,714 A | | 5/1962 | Skrmetta et al. |
| 3,704,484 A | * | 12/1972 | Lapeyre et al. ................. 452/5 |
| 3,706,113 A | * | 12/1972 | Lapeyre et al. ................. 452/5 |
| 3,740,795 A | * | 6/1973 | Cox ............................... 452/5 |
| 4,400,849 A | * | 8/1983 | Dell .............................. 452/5 |
| 5,108,342 A | * | 4/1992 | Lapeyre et al. ................. 452/5 |
| 5,120,265 A | * | 6/1992 | Ledet et al. .................... 452/5 |
| 5,980,373 A | * | 11/1999 | Rosow et al. ................... 452/5 |
| 6,017,268 A | * | 1/2000 | Rosow et al. ................... 452/5 |
| 6,139,415 A | * | 10/2000 | Rosow et al. ................... 452/5 |
| 6,248,010 B1 | * | 9/2001 | Sirgo et al. .................... 452/5 |

* cited by examiner

*Primary Examiner*—Peter M. Poon
*Assistant Examiner*—Joan Olszewski
(74) *Attorney, Agent, or Firm*—Keaty Professional Law Corporation

(57) ABSTRACT

An assembly for a seafood cleaning machines provides increased efficiency and decreases loss of meat of cleaned seafood items, such as shrimp, prawns, and the like. The assembly has a plurality of parallel rollers, a plurality of secondary rollers spaced between and mounted slightly above the power rollers, and a plurality of insert rollers fitted between adjacent power rollers and secondary rollers. Each insert roller has a variable diameter outside surface, gradually increasing from an upstream portion to the downstream portion. Smaller diameter upstream portion forms a tighter channel between the rollers and help the rollers to grab even smaller portions of the inedible parts of the crustaceans. To remove peeled off inedible portions, the assembly provides for a two-level water spraying, from above and below the insert rollers, thereby preventing a build-up of debris on the rollers and decreasing a possibility of over-peeling.

19 Claims, 3 Drawing Sheets

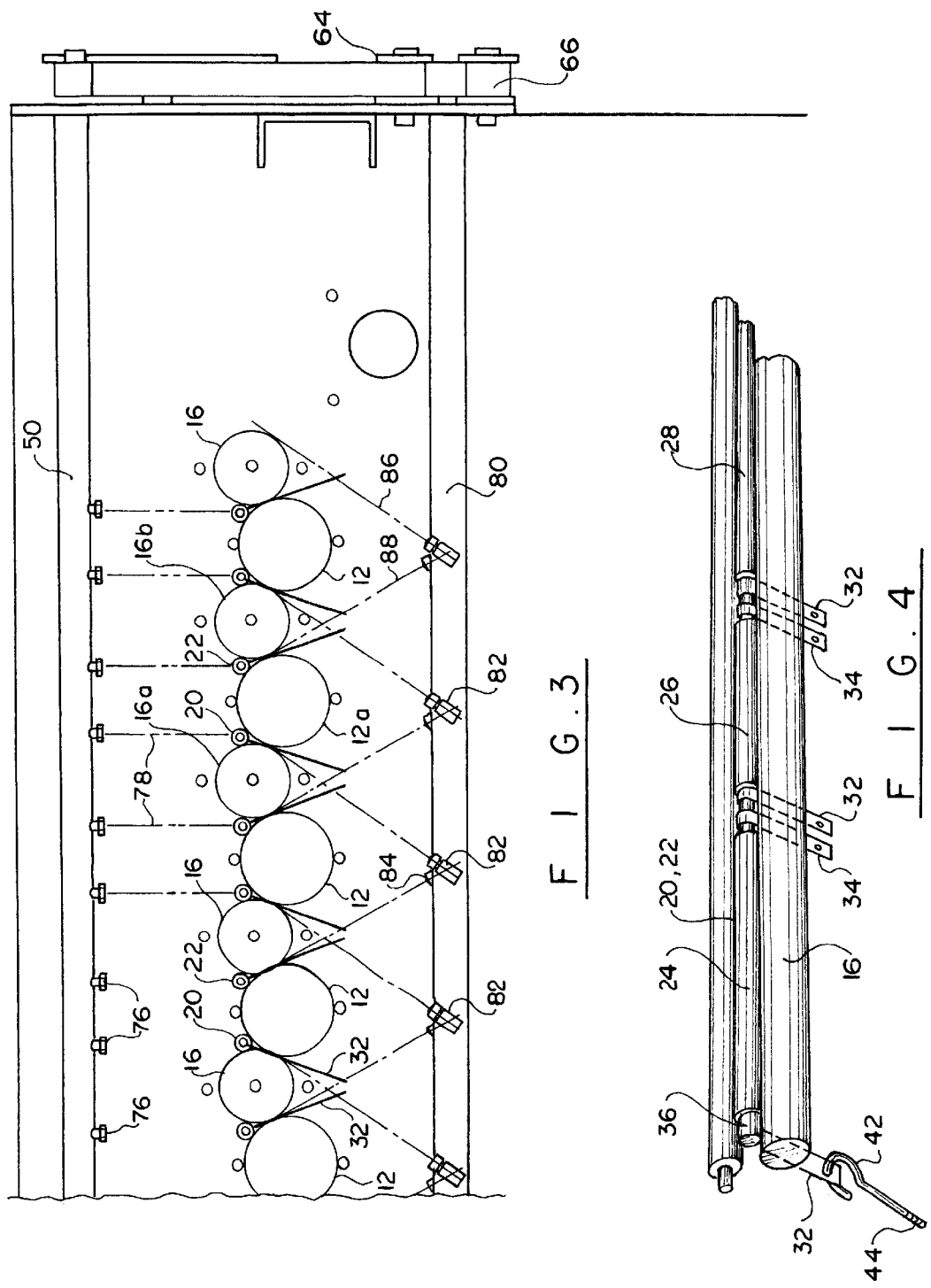

ASSEMBLY FOR A SEAFOOD CLEANING MACHINE

BACKGROUND OF THE INVENTION

The present invention relates to an apparatus for cleaning seafood, and more particularly to an assembly for a machine that is used to clean crustaceans, such as shrimp, prawns, crawfish, and the like.

Machines for peeling shrimp and prawns have been known since about the early 1950's. One of such machines is disclosed in U.S. Pat. No. 2,537,355 issued on Jan. 9, 1951 to Fernand S. Lapeyre, et al. In that machine, a channel is created for receiving unpeeled shrimp and for slowly peeling the crustaceans, removing hulls, shells, appendages, and other inedible portion of the crustaceans. The apparatus of the '355 patent uses a plurality of rollers, along which the seafood item slides, assisted by gravity and water flow. The shrimp are moved from one channel created by the rollers to another by reciprocating rotation of the rollers, causing the peeling of the shrimp and removal of the inedible portions. Pressure fingers hold the shrimp in firm contact with the rollers to facilitate peeling. The fingers are formed to approximately correspond to the contours of the channels formed between the rollers. The rollers move the shrimp from an elevated upstream portion of the roller assembly downstream, from where the peeled seafood item is deposited into a collector, while the inedible, peeled away portions of the shrimp are disposed of. The seafood cleaning machine of the '355 patent was the industry standard for many years. An improvement to the '355 patent is shown in U.S. Pat. No. 2,778,055 issued to Lapeyre, et al. in 1957 for "Machine for Peeling Shrimp." In accordance with the '055 patent, the roller assembly has a bottom roller, parallel side rollers disposed on opposite sides of the bottom roller and spaced above the bottom roller. The peeling channel is formed between the elevated rollers and the bottom rollers. Insert rollers are positioned between the bottom and side rollers to cover up crevices or spaces formed between the bottom roller and the elevated rollers. The inserts are strapped down in a resilient connection to the shrimp-peeling machine.

Another example of a shrimp peeling machine is shown in U.S. Pat. No. 2,781,544 issued in 1957 for "Seafood Cleaning Machine." In that patent, oscillating rollers are mounted in contact with the top surface of a shrimp-receiving platform. The surfaces of the rollers and the platform have different coefficients of friction so that the shrimp which is received in a crotch between the rollers is caused to rotate until the loose ends of the shells are caught between the rollers and the platform, and the shell is unwound from the shrimp.

While these devices worked satisfactory, it has been observed that with time, shrimp shells and appendages tend to accumulate on the rollers and cause separation between the rollers. For instance, the insert rollers may be lifted from the crotch area between the larger diameter rollers, such that an unusually large crevice is created between the insert rollers and the larger diameter rollers. As a result of the debris accumulation, the peeled shrimp may get caught in the spaces between the rollers, which will cause pinching of an edible portion of the seafood item and damage to the edible portion of the product.

Additionally, the insert rollers, which are held down at both ends by hold down straps tend to form a curvature when too much debris accumulates on the insert rollers. The insert rollers then create a "bow" in the mid-section, separating themselves from a frictional contact with the larger diameter rollers. Water that is supplied to help move the shrimp and remove the debris, seeps into the created crevice and is lost. Further, since the rollers are oscillating, the peeled hulls are pushed down between the rollers, then pulled up again above the rollers, which interferes with the normal peeling of the shrimp.

It was also observed that with the machines where the narrow insert rollers have the same diameter from the upstream portion of the cleaning machine to the downstream portion thereof, hulls or whiskers of the crustacean may cling to the shrimp body, even when the shrimp reach the downstream portion of the machine. Consequently, some shrimp remain under-peeled. This effect is particularly pronounced in cases where the processed product has different sizes.

The present invention contemplates elimination of drawbacks associated with the prior art and provision of an improved assembly for a seafood cleaning machine.

SUMMARY OF THE INVENTION

It is, therefore, an object of the present invention to provide an assembly for a seafood cleaning machine that reduces the amount of damage of the edible portions of the cleaned items.

It is another object of the present invention to provide an assembly for a machine designed for cleaning shrimp that reduces the buildup of peeled inedible portions of the shrimp.

It is a further object of the present invention to provide an assembly for a seafood cleaning machine that increases efficiency and productivity of the cleaning machine, while minimizing loss of the product to over-peeling.

These and other objects of the present invention are achieved through a provision of an assembly for a seafood cleaning machine that comprises a plurality of power rollers positioned in a spaced-apart relationship to each other and are adapted for reciprocating partial rotation about their longitudinal axes. A plurality of secondary, smaller diameter, rollers are mounted between the power rollers in frictional contact with the adjacent power rollers. A plurality of insert rollers are fitted in the spaces between the power rollers and the secondary rollers to create pinching channels for the hull, appendages, whiskers and other inedible portions of crustaceans.

Each insert roller has an outside diameter that varies from the upstream portion of the assembly to the downstream portion thereof. A narrow section of each insert rollers is mounted adjacent the upstream portion, while the wider portion of the insert roller is positioned near the downstream portion. As a result, a tighter space is formed upstream between the rollers, which helps to engage smaller portions of the hull, or shrimp shell. When the smaller elements of the inedible portions are caught between the rollers, there is less probability that the rollers pinch edible meat and damage the seafood item.

The assembly of the present invention is also more efficient in cleaning away the debris of the peeled away portions and eliminating any build-up. This benefit is achieved through a provision of a double level of water spray directed to the insert rollers. One level of the water supply is provided above the insert rollers, sending intermittent sprays of water, followed by a flushing cycle, from one or more transverse upper conduits mounted above the rollers. The second level of the water spray is delivered from one or more transverse lower conduits equipped with a plurality of spray nozzles located below the insert rollers. A combination of two-level time-regulated water supply eliminates build-up of debris on the insert rollers and helps increase efficiency of the seafood cleaning operation.

BRIEF DESCRIPTION OF THE DRAWINGS

Reference will now be made to the drawings, wherein like parts are designated by like numerals, and wherein

FIG. 3 is a detail view showing an end view of the roller assembly and illustrating direction of water sprays directed to the rollers.

FIG. 4 is a detail view of an insert roller with different diameter sections.

DETAILED DESCRIPTION OF THE PREFERRED EMBODIMENT

Figure 1:
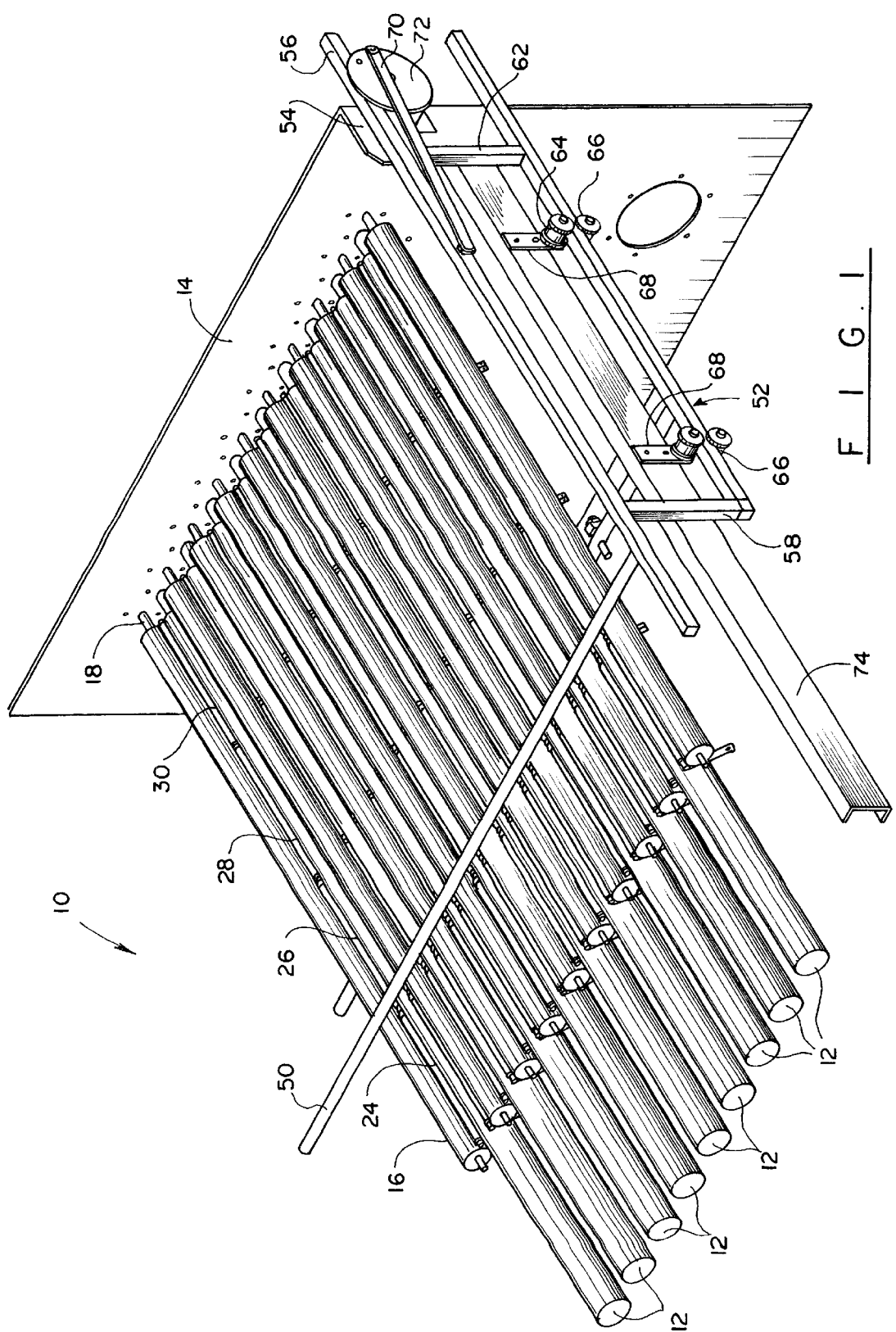
FIG. 1 is a perspective view of the assembly in accordance with the present invention for use in a seafood cleaning machine.

Turning now to the drawings in more detail, numeral 10 designates the assembly for a seafood cleaning machine in accordance with the present invention. As can be seen in the drawings, the assembly comprises a plurality of power rollers 12 mounted in a parallel, spaced-apart relationship to each other and secured at one of their ends to a back wall 14 of a seafood cleaning machine. The drawing of a seafood cleaning machine is omitted for clarity, it is to be understood that the seafood cleaning machine is provided with conventional power source, drive mechanism for operation of the rollers and movement of the water conduits, as will be described in more detail hereinafter. The power source may be an actuating mechanism with a pinion and rack arrangement to impart a reciprocating movement on the rollers.

Mounted above the power rollers 12, in a substantially parallel relationship to the longitudinal axes of the rollers 12 is a plurality of secondary rollers 16. The rollers 16 are also secured by their first ends, through shafts 18 to the back wall 14 for reciprocating movement about the axes of the shafts 18. As can be seen in the drawings, the diameter of the secondary rollers 16 is smaller than the diameter of the power rollers 12.

The rollers 16 are positioned between the power rollers 12 (see FIG. 3) and cover spaces between the power rollers 12, leaving narrow gaps between the outer surfaces of the power rollers 12 and the secondary rollers 16. A plurality of insert rollers 20, 22, are mounted between the adjacent power rollers and the secondary rollers 16 to substantially close the created gap.

The insert rollers 20, 22 cover the areas, or spaces formed between the power rollers 12 and the secondary rollers 16. In effect, the assembly 10 has a plurality of roller units, each unit formed by five rollers: one power roller 12, two secondary rollers 16, and two insert rollers 20 and 22.

As shown in FIG. 3, an example of a roller unit is designated by a power roller 12a, a secondary roller 16a, a secondary roller 16b, an insert roller 20 and a second insert roller 22. A frictional contact exists between the rollers of each roller unit. A number of channels are defined by adjacent power rollers and secondary rollers 16, with the insert rollers 20 and 22 fitted within these channels.

Each insert roller 20, 22 can be composed of one or more individual sections. In the drawings, each insert roller 20 or 22 is shown to consist of four sections 24, 26, 28, and 30.

Each roller section 24, 26, 28, and 30 is secured by a pair of tie down plates 32, 34. The tie down plates are secured to the central shaft 36, which extends outwardly from the main body of each insert roller 22, 24.

An aperture 40 is formed in a free end of the plates 32 or 34, and a hook 42 is inserted through the aperture 40. The hook 42 is connected to a spring 44 that allows adjustment of the relative position of the inserts 20, 22 in relation to the channels formed between the adjacent power rollers 12 and secondary rollers 16. The spring 44 allows for a resilient mounting of the insert rollers within a seafood cleaning machine.

Turning now to FIG. 4, the design of the insert rollers is shown in more detail. The insert roller sections 24, 26, 28, and. 30 (only sections 24, 26, 28 are shown in FIG. 4) have different outside diameters, with the smallest diameter section 30 being adjacent to the upstream portion of the assembly and the largest diameter portion 24 being adjacent to the downstream portion of the assembly 10. For instance, section 30 may have an outside diameter of 5/16", section 28 may have an outside diameter 6/16", section 26 may have an outside diameter of 7/16" and section 24 may have the largest diameter of 8/16". Each section, 24, 26, 28, and 30 reciprocates independently about its longitudinal axis.

When a seafood product, for example shrimp, are deposited onto the roller assembly, such as delivered by a conveyor or from the hopper, the smallest portions of the shrimp, such as appendages, are caught between the smallest diameter insert portion 30 and the adjacent secondary roller 16 and the power roller 12. The insert roller portion 30, being relatively narrow, allows to form a tighter pinching channel between the adjacent rollers 12 and 16 and cause even small protuberances of the shrimp shell to be caught between the rollers. At the same time, no damage is imparted on the shrimp meat. As the seafood item, such as shrimp, progresses downstream towards the insert roller portion 24, the hull portions that are still adhering to the shrimp will be caught and pulled away from the shrimp body, leaving clean, unblemished shrimp meat intact.

In addition to providing better peeling capability, the variable diameter insert rod portions prevent loss of valuable water. It was observed that when the shell buildup is created on the insert rods 20, 22, the rods, being tied down at opposite ends by the tie down plates 32 and 34, tend to lift themselves from their usual contact position with the power rod 12 and the secondary rods 16 and form a "bow." Water can seep through the created gap and be lost in the process. With the insert rollers 20 and 22 being composed of sections having gradually increasing diameters, the problem of damage to the valuable natural resource is substantially decreased or altogether eliminated.

In operation, the power rollers 12 and the secondary rollers 16 reciprocate back and forth, rotating about 280 degrees about their respective axes, i.e. the rollers move about their axes in one direction, then stop and reverse the direction of movement. This reciprocating movement causes the shrimp that is deposited on the roller assembly 10 to move between the rollers and have their shells, or hulls peeled away along with whiskers, appendages, etc.

It is envisioned that a one-piece insert roller 20 or 22 can be utilized for the purposes of the present invention when an insert roller has a frustoconical configuration, with an apex, that is the narrowest portion being positioned in the upstream portion of the roller assembly and the base of the frustoconical insert roller being adjacent to the downstream portion of the roller assembly. For instance, if the power roller 12 is selected to have 3" in diameter and the secondary rollers 16 have an outside diameter of 2½", the insert rollers 20, 22 can gradually increase in their outside diameter from 5/16" to 8/16". It has been found that the use of the different diameter insert roller portions produces a much more beneficial result in the cleaning capability of the assembly than a conventional approach of changing the texture or the friction capability of the rollers' exterior.

As the shrimp peeling process continues, the removed hull, appendages, whiskers, and other inedible parts are being pulled away, leaving edible portions intact. To facilitate movement of the shrimp and the removed portions downstream, the roller assembly 10 is positioned on an incline, with an upstream section being higher than the downstream section. Water is used to facilitate movement of the peeled shrimp and the removed portions to the downstream end. Water is supplied from above the roller assembly 10 and from a level underneath the roller assembly.

The upper portion of the water supply lines comprises a plurality of transverse water conduits, or pipes 50 (only one is shown in FIG. 1), spaced from each other and arranged in a parallel relationship to each other. The pipes 50 are carried by a frame 52 and secured to a side wall 54 of a cleaning machine. The frame 52 comprises a water supply line 56 supported by a pair of support members 58 and 60.

The support members 58 and 60 are secured at a right angle to the underside of the water supply line 56. The support members 58 and 60 are securely attached to a rail 62. A plurality of guide rollers 64 ride on the upper surface of the rail 62. A matching number of lower guide rollers 66 slide along the bottom surface of the rail 62. The rollers 64, 66 are arranged in pairs, as shown in FIG. 1, and are secured at their free ends to a bracket 68. The brackets 68 are fixedly attached to a bar 74, which in turn is fixedly attached to the back wall 14.

A crank 70 is secured at one end to the water supply line 56 and, at its other end to a rotating disk 72. The disk 72 is connected to a power source (not shown) which moves the disk 72 causing the fixedly attached crank 70 to move back and forth, pulling the frame 52 and, thereby moving the water pipes 50 a distance above the roller assembly 10. The diameter of the disk 72 controls the distance to which the pipes 50 travel across the roller assembly 10. The guide rollers 64 and 66 rotate and move along the rail 62, facilitating reciprocating movement of the frame 52 above the roller assembly 10.

Figure 2:
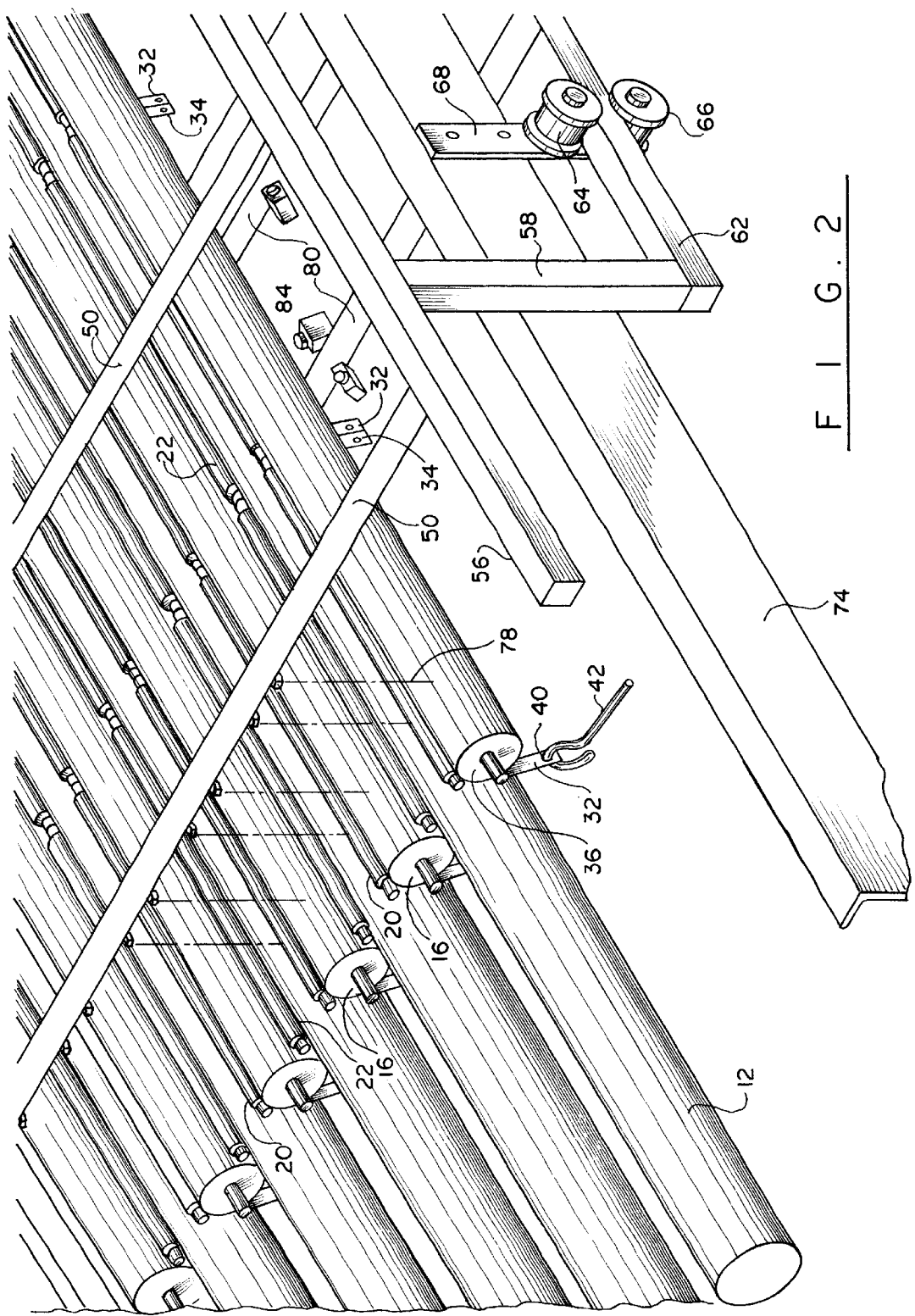
FIG. 2 is a detail view of the assembly of FIG. 1, showing in more detail position of the rollers and the water supply conduits.

A plurality of upper spray nozzles 76 is attached to the underside of each waterline, or pipe 50. The nozzles 76 are oriented with their openings facing down, so that jets of water, shown in phantom lines 78 in FIGS. 2 and 3, are directed from above onto the insert rollers 20 and 22. The spray flow 78 helps wash away the debris and facilitates movement of the cleaned seafood items downstream along the roller assembly. The distance to which the water conduits 50 travels can be as little as 6–7" in one direction. The travel distance of the water pipes 50 is not designed to cover the entire surface of the roller assembly 10.

It was observed that with time, the buildup of removed inedible matter becomes so substantial that it prevents normal movement of the product along the roller assembly 10, and the water supply from only the top of the roller assembly is not sufficient. In order to prevent the build-up of debris on the insert rollers 20, 22, an upward stream of cleaning water is provided in the assembly of the present invention. As shown in the drawings, one or more lower water supply lines 80 extend underneath the rollers 12, each lower water conduit 80 being also connected to the frame 52.

A plurality of spray nozzles 82 is secured in fluid communication with each water supply conduit 80 on one side of the pipe 80. A plurality of similar spray nozzles 84 is positioned on the opposite side of the pipe 80. The spray nozzles 82 and 84 are secured at an acute angle in relation to the longitudinal axis of the pipe 80. The angle of the direction of the jet heads 82 and 84 can be 30 to 45 degrees in relation to the longitudinal axis of the pipe 80. As shown in FIG. 3, the spray nozzles 82 and 84 are oriented in opposite directions, sending sprays of water shown in phantom lines 86 and 88, respectively, between the secondary rollers 16, towards the insert rollers 20, 22, where the most likely buildup is to occur.

In operation, the water supply frame 52 is connected to a timer (not shown) for intermittent operation of the jet nozzles 76, 82, and 84. The usual cycle consists of a few seconds of spray, while the frame 52 travels alongside the roller assembly 10, then an idle pause, when the frame 52 comes to a stop. Then, a flushing step takes place, when the water flow is delivered through the pipes 50 and 80 and to the spray heads 76, 82, and 84, flushing the rollers with water and dislodging any accumulated debris.

Then the frame 52 moves in the opposite direction, while continuing to spray the rollers, stopping at the end of the travel and providing the flushing step again. The intermittent cycles of spraying continue while the peeling of the seafood items deposited on the rollers takes place.

It is preferred that the spray nozzles 76, 82, and 84 be directed towards the insert rollers 20, 22, to a place where the possibility of a build-up exists. When providing the intermittent spraying and flushing steps in the cleaning cycle, the valuable natural resource, water, can be saved and not lost to a flow between the rollers, as it would be, had a buildup of peeled off inedible portions be allowed to continue. When the shells and other inedible portions are continuously removed from the rollers, the seafood items are cleaned better and the loss of the edible portions due to over peeling is substantially minimized.

The flushed-away inedible portions are removed from the downstream portion of the assembly 10 and are disposed of in the usual manner. The edible portions of the seafood items, such as cleaned shrimp, are deposited into a container, from where the product can be packaged, frozen or otherwise processed for delivery to a customer.

It is envisioned that the power rollers 12 and the secondary rollers 16 can be covered with soft resilient sleeves, for example made of rubber, and the insert rollers 20, 22 be made of a non-corrosive material, such as stainless steel. The number of water lines 50 and 80 can vary depending on the length of the rollers and can be 3 or 4 in number. The spring action of the hook 42, securing the insert rollers 20, 22 can be easily adjusted by the selection of the spring 44 having different tensile characteristics.

Many other changes and modifications can be made in the design of the present invention without departing from the spirit thereof. I, therefore, pray that my rights to the present invention be limited only by the scope of the appended claims.

I claim:

1. An assembly for a seafood cleaning machine, comprising:
    a plurality of power rollers mounted in a parallel spaced-apart relationship to each other and extending from an upstream of the assembly to a downstream of the assembly;
    a plurality of secondary rollers mounted above and in frictional contact with a pair of adjacent power rollers;

a plurality of insert rollers, each mounted in frictional contact between a power roller and an adjacent secondary roller, each of said insert rollers having a variable outside diameter that increases from an upstream section thereof to a downstream section of each insert roller, and wherein said power rollers, said secondary rollers and said insert rollers are operationally connected to the seafood cleaning machine.

2. The assembly of claim 1, wherein said power rollers, said secondary rollers and said insert rollers are adapted for a reciprocating movement about their respective longitudinal axes.

3. The assembly of claim 1, wherein said exterior surfaces of one insert roller, one secondary roller and one power roller form a pinching channel for engaging inedible portions of a seafood item deposited on the assembly.

4. The assembly of claim 3, wherein said pinching channel varies in width from the upstream of the assembly to the downstream of the assembly.

5. The assembly of claim 1, further comprising a means for delivering a cleaning liquid from above and below said insert rollers.

6. The assembly of claim 5, wherein said means for delivering a cleaning liquid comprises at least one upper conduit extending above said insert rollers and at least one lower conduit extending below said insert rollers.

7. The assembly of claim 6, wherein said at least one upper conduit extends transversely to longitudinal axes of said insert rollers, said at least one upper conduit being provided with a plurality of downwardly facing spray nozzles for delivering the cleaning liquid on top of said insert rollers.

8. The assembly of claim 6, wherein said at least one lower conduit extends transversely to longitudinal axes of said insert rollers, said at least one lower conduit being provided with a plurality of upwardly facing lower spray nozzles for delivering the cleaning liquid from below said insert rollers.

9. The assembly of claim 8, wherein said lower spray nozzles comprise pairs of lower spray nozzles positioned on opposite sides of said at least one lower conduit, said lower spray nozzles being oriented at an acute angle in relation to a longitudinal axis of said at least one lower conduit.

10. The assembly of claim 9, wherein each of said pairs of lower spray nozzles has a first lower spray nozzle and a second lower spray nozzle oriented at an acute angle in relation to said first lower spray nozzle.

11. The assembly of claim 6, wherein said at least one upper conduit and said at least one lower conduit provide intermittent spray of cleaning liquid to facilitate movement of the seafood items deposited on said assembly and removal of inedible portions of said seafood items removed by said power rollers, said secondary rollers and said insert rollers.

12. assembly for a seafood cleaning machine, comprising:
a plurality of power rollers mounted in a parallel spaced-apart relationship to each other and extending from an upstream of the assembly to a downstream of the assembly;

a plurality of secondary rollers mounted above and in frictional contact with a pair of adjacent power rollers;

a plurality of insert rollers, each mounted in frictional contact between a power roller and an adjacent secondary roller, each of said insert rollers having a variable outside diameter that increases from an upstream section thereof to a downstream section of each insert roller, and wherein said power rollers, said secondary rollers and said insert rollers are operationally connected to the seafood cleaning machine; and a means for delivering a cleaning liquid from above and below said insert rollers to facilitate movement of seafood items deposited on said assembly and for removal of inedible portions of said seafood items removed by said power rollers, said secondary rollers and said insert rollers.

13. The assembly of claim 12, wherein each of said insert rollers is fitted in a space between adjacent power roller and a secondary roller to form pinching channels for engaging inedible portions of seafood items deposited on said assembly.

14. The assembly of claim 13, wherein said each of said insert rollers comprises a plurality of separate sections, each section being resiliently secured between adjacent power rollers and secondary rollers.

15. The assembly of claim 12, wherein said means for delivering a cleaning liquid comprises at least one upper conduit extending above said insert rollers and at least one lower conduit extending below said insert rollers.

16. The assembly of claim 15, wherein said at least one upper conduit extends transversely to longitudinal axes of said insert rollers, said at least one upper conduit being provided with a plurality of downwardly facing spray nozzles for delivering the cleaning liquid on top of said insert rollers.

17. The assembly of claim 15, wherein said lower spray nozzles comprise pairs of lower spray nozzles positioned on opposite sides of said at least one lower conduit, said lower spray nozzles being oriented at an acute angle in relation to a longitudinal axis of said at least one lower conduit.

18. The assembly of claim 17, wherein each of said pairs of lower spray nozzles has a first lower spray nozzle and a second lower spray nozzle oriented at an acute angle in relation to said first lower spray nozzle.

19. The assembly of claim 15, wherein said at least one upper conduit and said at least one lower conduit provide intermittent sprays of cleaning liquid to facilitate movement of the seafood items deposited on said assembly and removal of inedible portions of said seafood items removed by said power rollers, said secondary rollers and said insert rollers.

* * * * *